United States Patent Office 3,244,590
Patented Apr. 5, 1966

3,244,590
POLYENIC COMPOUNDS AND PROCEDURES RELATED THERETO
Carl P. Schaffner, Somerville, and Edward Borowski, Highland Park, N.J., assignors to Rutgers Research and Educational Foundation, New Brunswick, N.J., a nonprofit corporation of New Jersey
No Drawing. Filed Dec. 23, 1960, Ser. No. 77,847
12 Claims. (Cl. 167—65)

This invention relates to heptaene macrolide compounds, having antifungal properties, which constitute a class of substances that have been produced, as antibiotics, by cultivation of various organisms and by extraction of the substance from the culture. A number of such compounds are known, such as candidin, amphotericin B, candicidin, trichomycin and perimycin, which have been used or proposed for use as antifungal agents and which have been the subject of extensive study.

It has been demonstrated that these substances are essentially high molecular weight, macrocyclic lactones, better known as macrolides, and that they each possess a chromophore of seven conjugated double bonds. In addition to the large lactone nucleus, or linked to it, the compounds include other characteristic or significant groups, in all cases including one amino sugar. While characteristic chemical differences are known to distinguish various members of the group from each other, they have a basic structural similarity of the nature stated, i.e. in comprising a large lactone nucleus, and in including presumably as part of the nucleus, a system of seven conjugated double bonds, and in having one or more amino groups, including an amino sugar moiety. Thus they can be described as comprising an amino sugar glycoside of a macrolide nucleus.

These substances are differentiated as a class from a number of other antifungal antibiotics, having other conjugated linkages, viz. tetraenes, pentaenes and hexaenes, well known examples of such other compounds being nystatin and rimocidin (tetraenes), and fradicin, a hexaene.

While the heptaene antifungal compounds have been recognized as valuable, particularly in their powerful antifungal properties and in the apparent inability of fungus organisms to develop readily any strains or forms that are resistant to these polyenes, their use has been limited by lack of adequate water solubility in forms of the substance which are otherwise stable and appropriate. Thus, for example, a number of these heptaene antifungal compounds are amphoteric in nature, in that they also include a carboxylic moiety. While so-called salts, such as sodium salts, have been produced by appropriate reaction of alkali with the carboxylic group and while the resulting substance has considerable water solubility in circumstances where an appropriately high pH is retained, the stability of the compound is adversely affected. At lower pH values, particularly under acid conditions, the compound reverts to insoluble form. With a substance such as perimycin (originally known as NC-1968), which does not contain a carboxylic group and which is basic in character, it is conceivable to produce acid salts, such as the hydrochloride, but the resulting water solubility is only exhibited at low pH values, while stability is again affected.

Some effort has been made to develop modifications of these and other polyenes that might exhibit greater water solubility, but so far as we are aware, no success has been achieved in preparing a product which has true solubility of a high order and at the same time retains useful stability and significant antimicrobial properties. For instance, it has been proposed to make a water soluble complex of amphotericin B with desoxycholic acid, which acts as a detergent, and similar complexes of other polyenes. These complexes, however, do not form true solutions; the substance appears merely to be dispersed as a colloid and will not dialyze, so that the field of utility of the material is correspondingly limited. The rather large amount of desoxycholic acid, moreover, can exert some undesiralbe side effects, for instance when the substance is sought to be used as an antifungal constituent in a medium for tissue culture.

It has now been discovered that important new compounds may be prepared from these heptaene antifungal antibiotics, by N-acylation, specifically in preparing new and useful derivatives of the heptaenes with such operation wherein the free amino group (constituted in the amino sugar) is blocked by N-acylation. The immediately resulting N-acyl derivatives of the stated substances are generally valuable compounds and are true derivatives, involving covalent substitution and having corresponding chemical stability. In general they retain biological activity, which has appeared to be qualitatively similar to that of the parent heptaene, and although in a number of cases it is quantitatively reduced, the other attributes of the compounds appear to compensate for such reduction.

Among the useful properties of a considerable number of such N-acyl derivatives that have been prepared and examined, are improved solubilities of the derivative in various media, such as organic solvents, with no lower stability in solution in such liquids, and ability of the N-acyl derivative, in one way or another, to form desirable water soluble salts, viz. compounds having useful water solubility and in general lacking the disadvantages of instability or of incompatibility with neutral or near neutral conditions of pH, that have characterized prior efforts to make the original antibiotic substances soluble. Other uses of the N-acyl derivatives reside in the provision of improved techniques, using such derivatives, for identifying or classifying heptaene antibiotics, and indeed also in the provision of improved procedures for extracting or purifying these compounds.

As explained, a particularly important improvement achieved by N-acylation and by conversion of the selected N-acyl derivative to a salt of a suitable cation, is the achievement of a truly water soluble compound, having biological properties, specifically antifungal activity, corresponding to that of the parent heptaene antibiotic. These new water soluble substances have been found notably useful in the field of tissue culture. As explained more fully hereinbelow, preparation and maintenance of cultures of living tissue are operations employed in a wide variety of circumstances, not only to a great extent in biological and medical research, and also diagnostic procedures, but also in the manufacture of vaccines and similar preparations. While antibacterial antibiotics have found good use in tissue culture techniques, for the prevention or elimination of bacterial contamination, the problem of mold, i.e. fungus infection, has raised difficulties, particularly in finding agents which would be effectively soluble in the media, usually aqueous, employed for such cultures, and which at the same time would have no undesirable effects with respect to the tissue or the operations performed. N-acyl derivatives of these heptaene macrolides, i.e. particularly in the form of water soluble salts, are found to function effectively for the prophylaxis and disinfection of tissue cultures, the substances being abundantly potent in antifungal action and at the same time being free of effects undesirable for the purposes of tissue cultivation or maintenance.

The derivatives produced in accordance with the invention are, as stated, N-acyl derivatives of heptaene antifungal antibiotics, generally prepared by reaction of the corresponding acid anhydride with the antibiotic substance, although other procedures, i.e. as by using the acyl chloride, are contemplated as useful. Thus the new compounds are in effect derived from various organic acids, which correspond to the acyl groups appearing in the reaction product. In general, acyl derivatives to which the invention relates are thus derived from monocarboxylic aliphatic acids, substituted monocarboxylic aliphatic acids, dicarboxylic aliphatic acids, aromatic carboxylic acids and substituted aromatic carboxylic acids. Thus the new acyl compounds, and their salts, can be defined as derivatives of a heptaene antifungal compound and an organic acid of the class defined above, the acyl group of the acid being linked to at least one amino nitrogen atom of the heptaene substance.

In the case of the aliphatic acids, particularly significant results have been attained where the carbon structure of the acid is of the class of alkyls and substituted alkyls, especially so-called lower alkyls. Thus considering formyl as derived from methyl, acetyl as derived from ethyl, and so forth, the basic hydrocarbon corresponding to, or involved as the parent of, the carboxyl group (and also the acid itself) may be considered as preferably selected from the class containing from 1 to 9 carbon atoms, it being further understood that the preferred dicarboxylic acids can be analogously defined as containing from 2 to 10 carbon atoms, in all cases with respect to the unsubstituted structure of the acid.

Examples of the various types of derivatives thus contemplated within the preferred classes are formyl, acetyl, propionyl, chloroacetyl (and other halogen-substituted aliphatic monocarboxylic acids), other substituted lower fatty acids such as phenylacetyl and phenoxyacetyl, butyryl, valeryl, caproyl, succinyl, maleyl, and the like, it being noted that generally the preferred monocarboxylic aliphatic acids are of the series of saturated acids, while the dicarboxylic acids may be saturated or may contain an unsaturated linkage. In the series of aromatic carboxyilc acids, appropriate derivatives are phthalyl, 3-nitrophthalyl, benzoyl, substituted benzoyls, the derivative of naphthalene dicarboxylic acid, and the like. By way of convenient nomenclature, the produced N-acyl derivatives can be styled, and indeed defined, by their corresponding names, for example N-acetyl candicidin, N-propionyl candidin, N-succinyl amphotericin B, N-succinyl perimycin, N-3-nitrophthalyl candidin, N-phthalyl amphotericin B, and so forth.

The compounds are conveniently prepared by reaction of the corresponding acid anhydride with the heptaene. Thus for instance in preparing N-acetyl candidin, a fine suspension of the candidin in methanol is treated with acetic anhydride, while cooling to remove the heat of reaction. The desired derivative, in solution, can be separated in any suitable way, as by treating the clear solution with an ether mixture to precipitate such product, which can be separated, as by centrifuging, and then washed and dried. Further purification can be effected, e.g. on re-dissolving in methanol and re-precipitating with ether. This general procedure may be followed for most of the various desired derivatives, using a correspondingly selected acid anhydride. Alternatively, other known methods of acylating amine bases can be employed, for example, by using the acyl chloride, as in a medium comprising pyridine and water, or in appropriate buffered systems in aqueous alcohol, and thereupon or therein eliminating the chlorine ions (as by neutralization with alkali) and recovering the N-acyl heptaene. Other procedures are possible; for example the N-formyl derivative can be produced by refluxing the heptaene in a pyridine-methyl formate mixture.

Salts of the derivatives, i.e. representing introduction of an appropriate cation such as sodium, lithium, cesium, ammonium (or more generally, the alkali metals, such term here including ammonium), and the cationic or equivalent portions of various organic bases such as procaine, alkaloids, alkyl amines and the like, may be prepared in a suitable fashion which will now be readily understood. For instance, the sodium salt of an N-acyl heptaene, such as N-acetyl candicidin, is made by dissolving the simple derivative in an appropriate solvent, such as methanol, and treating with an alkali such as sodium hydroxide until an alkaline pH value, e.g. 8, is established. The salt is precipitated with ether, separated, washed and dried.

The heptaene compounds to which the present application is applicable, have been found to be classifiable in at least three groups, which may be correspondingly identified by number. Group I, of which candidin and amphotericin B are examples, is understood to consist of heptaene compounds including a macrolide nucleus, one carboxyl group and a single amino group, the latter being represented by an amino sugar, specifically mycosamine. Group II, of which examples are trichomycin (meaning what is sometimes called trichomycin B) and candicidin, represents heptaene antibiotics, each of which contains a macrolide nucleus, a carboxyl group, an amino sugar (specifically mycosamine, as in the case of Group I), and a second amino group, carried by an aromatic moiety. Specifically, the second amino radical in the Group II heptaenes is understood to be a para amino phenyl group, which can be isolated as para amino acetophenone.

A third type of heptaene antibiotic, identified as Group III, is exemplified by perimycin. In this case there is also a macrolide nucleus, but there is no carboxyl group. There are, however, two amino radicals, similar to but not identical with the amino moieties of the compounds of Group II. Thus perimycin has an amino sugar, which is different from mycosamine, but is nevertheless similar in respect to its adaptability to N-acylation. Perimycin also includes an aromatic amino moiety, which is likewise different from that of compounds in Group II, being a para amino benzyl group, i.e. a moiety which can be isolated as para amino phenyl acetone. Summarizing, it will be noted that all antibiotics of this series of groups contain a free primary amino group in the form of an amino sugar. Groups I and II also contain a carboxyl group, whereas Group III contains no such functional radical. Groups II and III, however, each contain a second free primary amino radical, specifically in the form of an amino aromatic moiety.

Although the specific heptaene substances named above as representative examples of the several groups are believed to be well known and fully identified by their names, references may be given here, for abundance of identification, to various publications and patents which describe these substances and indicate the manner in which they may be produced or obtained. Thus candidin is described in the following publications:

Taber, W. A., Vining, L. C., and Waksman, S. A., "Candidin, A New Antifungal Antibiotic," Antibiotics and Chemotherapy, vol. V, No. 4, 455–461 (1954).

Vining, L. C., and Taber, W. A., "Preparation and Properties of Crystalline Candidin," Canadian Journal of Chemistry, 34, 1163–1167 (1956).

Candidin is also described in the copending application of Taber, Vining and Waksman, Serial No. 497,548, filed March 29, 1955, now abandoned.

Amphotericin B is described in U.S. Patent No. 2,908,611, issued October 13, 1959, to Dutcher, Gold, Pagano and Vandeputte.

Trichomycin will be found described in the following references:

Hosoya, S., Komatsu, N., Soeda, M., and Sonoda, Y., Jap. J. Exp. Med., 22, 505 (1952).
Hosoya, S., et al., J. Antib. (Japan) 8, 5 (1955).
Hosoya, S., et al., J. Antib. (Japan) 8, 48 (1955).

Candicidin is identified in the following:

H. Lechevalier, R. F. Acker, C. T. Corke, C. M. Haenseler, and S. A. Waksman: "Candicidin, A New Antifungal Antibiotic," Mycologia, XLV, No. 2, 155–171, March–April 1953.

H. Lechevalier: "La Candicidine," La Presse Medicale, 61st Annee, No. 66, Oct. 17, 1953, 1327–1328 (Paris).

Candicidin is also described in the copending application of Waksman and Lechevalier, Serial No. 308,616, filed September 9, 1952, now U.S. Patent No. 2,992,162.

The antibiotic substance perimycin was originally styled by a number 1968, and has been disclosed as such, or otherwise, in the following references:

Oswald, E. J., Reedy, R. J., and Randall, W. A., "An Antifungal Agent, 1968, Produced by a New Streptomyces Species." Antibiotics Ann. 1955–1956, pages 236–239.

Campbell, C. C., Hill, G. B., and Brooks, B. E., "Therapeutic Activity of a New Antibiotic, 1968, in Mice With Experimental Histoplasmosis, Sporotrichosis, and Moniliasis." Antibiotics Ann. 1955–1956, pages 240–244.

U.S. Patent No. 2,959,925, issued October 18, 1960, to W. E. Woolridge, entitled "Antifungal, Antibiotic from *S. coelicolor* var. *aminophilus*."

This antibiotic, also called NC-1968, and for a brief interval identified as aminomycin, is further described in a paper by the present applicants (Edward Borowski and Carl P. Schaffner), together with Hubert A. Lechevalier and Benjamin S. Schwartz, entitled, "Perimycin, A Novel Type of Heptaene Antifungal Antibiotic," printed in Antimicrobial Agents Annual—1960, pages 532–538, which was published by Plenum Press, Inc., New York, N.Y., on October 27, 1961, the text of said paper having been originally set forth in this patent application, and being now deemed to be incorporated herein by reference.

It will be understood that where a heptaene compound of the class herein described is identical with one of the above-named compounds but has been known by another name by reason of independent production or production in accompaniment to other antibiotics, the identification of such substance by the name set forth above is intended to mean the same compound under all other designations. For example, it has been indicated that antibiotics known as candimycin and heptamycin are in fact identical with candicidin. It is also noted that some preparations of trichomycin have been regarded as a complex, being mainly trichomycin B. Inasmuch, however, as both trichomycin B and at least another member of such complex are indicated to be members of Group II in the above classification of heptaenes, and inasmuch as their chemical reactions are identified so far as the present invention is concerned, reference may be conveniently made herein simply to trichomycin, e.g. as meaning the complex (in cases where it is produced) or its chief component trichomycin B, whether produced from the complex or alone.

Indeed the complex appears to be largely heptaenic as a whole, and correspondingly susceptible to N-acylation in accordance with this invention.

The general nature of the acylation reactions herein described, and of the products formed, can be further illustrated by equations, taking for example the reaction of an antibiotic of each group with a suitable acid anhydride. While complete structural formulae for these heptaenes have not as yet been elucidated, the reactive parts significant to the present invention are sufficiently established, as likewise the fact that such parts or moieties are related to the basic macrolide or lactone nucleus of the molecule in each case. Thus, although the specific manner of linkage to such nucleus may not be fully known, the molecule can be nevertheless properly represented by a symbol [M] as meaning the macrolide nucleus (including the chain of conjugated double bonds), to which are linked (in appropriate fashion, here designated by a simple connection) the several moieties significant to the present invention.

Thus in every case, one of these attached moieties is an amino sugar, designated simply as [X]NH$_2$. This amino sugar grouping is understood to be of the following type (attached to the lactone nucleus through one of the hydroxyl radicals), R$_1$ being an appropriate substituent such as CH$_3$ where the amino sugar is mycosamine:

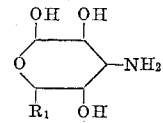

A further moiety similarly illustrated as linked to the lactone nucleus in certain compounds is the carboxyl group, COOH.

Finally, some of these heptaenes include an aromatic amino moiety, as explained above, which may be represented as NH$_2$[Ph—R]. This aromatic group is understood to be represented by the following structure, with linkage to the nucleus through one of the unsubstituted carbon atoms of the ring:

Thus, for example, where R is

the moiety is para amino phenyl, and where R is

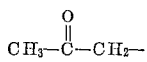

the moiety is para amino benzyl.

With the foregoing in mind, the following can be taken to represent the reaction of an antibiotic of Group I with acetic anhydride, to yield the N-acetyl derivative of such compound:

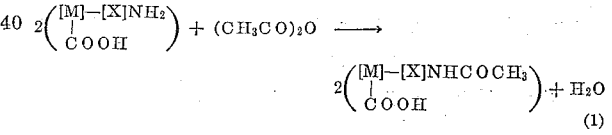

(1)

Similarly an antibiotic of Group II is understood to react with acetyl anhydride in accordance with the following, again to yield the N-acetyl derivative:

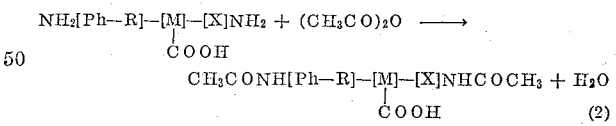

(2)

Since the reaction of an antibiotic of Group III with acetyl anhydride is essentially the same in the case of a compound of Group II, i.e. as to acylation of the amino groups respectively associated with the amino sugar and aromatic moieties, the following equation represents what is now understood to be the reaction of a Group III substance, e.g. perimycin, with succinyl anhydride, for preparation of the corresponding N-succinyl derivative, a compound of special utility:

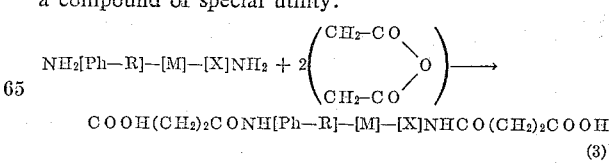

(3)

It will be understood that like equations can be written to represent the fundamental reaction of acylation with other acids or acid anhydrides, as by substituting an appropriately different formula for the acyl group in the anhydride and the product. For example in Equations 1 and 2 substitution of other appropriate hydrocarbon groups for CH$_3$ in the acyl radicals, would represent other acids. Thus, in making the propionyl derivative, the same equation holds true, with $C_2H_5$ substituted for $CH_3$. Likewise in the case of Equation 3, using a dicarboxylic acid, other like reactions are represented by substituting appropriate hydrocarbon linkages for $CH_2$—$CH_2$. Thus in the case of maleic acid, this grouping becomes $CH$=$CH$, yielding an N-maleyl derivative of the antibiotic.

Whereas, in general, acylation of heptaenes of types such as embraced by Groups II and III results in substitution of the acyl radical for a nitrogen atom of both amino groups in the parent compound, it is conceived that in some cases or for some purposes monosubstituted products may result involving acylation of only one amino group, specifically the amino sugar. Thus with an excess of such heptaene, a mixture of disubstituted and monosubstituted products, respectively having both amino groups acylated and having only the amino sugar group so converted, may be produced, from which the latter, monosubstituted type of compound may be separated. It is understood that acylation of the amino sugar group occurs preferentially to any acylation of the aromatic amino group alone, and indeed such result is desirable in that the principal basicity of the parent compound is believed to be attributable to the amino sugar moiety. For purposes of definition herein, however, it will be understood that where reference by name is made to N-acyl derivatives of specific compounds, e.g. N-acetyl candicidin, N-succinyl perimycin, and the like, such designations, unless otherwise stated, mean a product (disubstituted in these examples) wherein each free amino group of the parent compound has been acylated.

Preparation of the important water soluble salts of the N-acyl derivatives has been described above, i.e. usually involving reaction of such derivative with a suitable base. Equations of the salt-forming reaction need not be set forth in detail, it being understood that such reaction involves substitution of the selected cation, such as sodium, ammonium, or corresponding organic radical, for a hydrogen ion of the carboxyl group. In cases of derivatives such as the compound produced by reaction (3) above, where a plurality of carboxyl groups are present, the salt is usually formed by reaction of the base with all of said groups (the sodium salt of N-succinyl perimycin thus usually being dibasic), although it is conceived that in some situations less than all of the carboxyl groups will be neutralized. In general, or unless otherwise stated, salts specifically described herein have been compounds where complete neutralization of the carboxyl radicals has been effected.

As generally indicated above, the new derivatives of the present invention avoid a number of difficulties heretofore associated with the heptaene antibiotics. For instance as to compounds of the class of Groups I and II, some of the problems of isolation and solubility have stemmed from the fact that these substances are amphoteric and possess sites of highly lipophylic and hydrophylic character, in the same molecule. In the case of all the groups, the basic character of the nitrogen moieties, especially the amino sugar moiety, has been detrimental, particularly with respect both to solubility and to instability to changes of pH, the latter problem also being heightened by the presence of a strained lactone and an amino sugar, glycosidically-linked. By N-acylation, whereby nitrogen substitution compounds, being true compounds of the nature of substituted amides, are produced and thus remove the basic character of the nitrogen moiety, reduction or avoidance of the foregoing difficulties is attained or attainable. The amphoteric substances are made acidic, forming water soluble salts with organic or inorganic bases, in a manner which would not be achieved with the free amphoteric heptaene.

Whereas in the case of a substance having no carboxyl radical, such a perimycin (Group III), the product of acylation with a monocarboxylic acid residue does not yield an acidic compound (although nevertheless one which has definite advantages of stability and of good solubility in solvents other than water), the reaction with dicarboxylic groupings serves to introduce an acidic radical, while getting rid of the basic character of the nitrogen moiety in the manner indicated above. The resulting derivative then forms water soluble salts in the desired fashion. The dicarboxylic acids can also be used with the amphoteric compounds, in effect enhancing the acidic character of the immediate N-acyl derivative, and of course, permitting salt formation, e.g. as by neutralization of at least one and usually all of the carboxyl radicals. In general, the water soluble salts can be formed at or near neutral pH, and have effective stability under such pH conditions. These salts are dialyzable and form true solutions, with corresponding advantages of use.

A number of specific examples of N-acylation follow below, it being understood that similar procedures may be employed with other antibiotics and with other acid residues or like reagents, to yield a variety of N-acyl compounds, within the general scope of the invention as explained above.

EXAMPLE 1

*Preparation of the N-acetyl derivative of candidin.*—One gram of substantially pure candidin was ground in 50 ml. (milliliters) of methanol to form a fine suspension. Seven ml. of acetic anhydride were added, with shaking, and the mixture was stirred at room temperature for one hour. As the polyene (candidin) was acetylated, a considerable amount of heat was involved, and it was removed by appropriate cooling of the vessel. In this instance, the temperature was so controlled by occasional immersion of the flask in water. As the reaction progressed, the suspended solids were essentially all dissolved. After one hour the mixture was centrifuged, and a small residue of undissolved material was discarded. To the clear supernatant, 600 ml. of a 1:1 mixture of ethyl ether and petroleum ether were added. A golden yellow solid was precipitated, and was separated with the aid of centrifuging. The product was washed repeatedly with ethyl ether until the methanol and the excess of acetic anhydride had been removed. Thereupon it was dried in vacuum and yielded 0.7 g. of N-acetyl candidin. Further purification was effected by dissolving the derivative in warm methanol, then precipitating by cooling, washing the precipitate with ethyl ether and re-drying in vacuum. The melting point was 165° C., with decomposition.

EXAMPLE 2

In this instance, the acetylation step was applied to an impure heptaene, demonstrating the special utility of the N-acyl derivative in effectuating purification of heptaene antibiotics in a novel and highly effective manner. Specifically, the procedure of Example 1 is carried out utilizing 2 grams of candidin of 50% purity, the impurities being such as are associated with normal procedures for extracting the antibiotic from the culture in which it has been produced. An N-acetyl produce was obtained, which had evident impurity. It was then submitted to countercurrent distribution by known procedure involving 200 transfers (e.g. in a 200-tube machine) and utilizing the solvent system consisting of pyridine:ethyl acetate:water in the respective proportions 3.5:6.5:8.3 (by volume). The combined fractions containing the purified product, i.e. resulting from the countercurrent distribution and identified by ultraviolet spectra or biological assay or both, were then extracted with petroleum ether, for removal of ethyl acetate and pyridine. The residual aqueous phase was then concentrated in vacuum, and acidified with acetic acid, yielding a precipitate of N-acetyl candidin. This product was centrifuged, washed well with acetone and finally dried in vacuum, and yielded N-acetyl candidin of purity equivalent to that of the product of Example 1.

EXAMPLE 3

The procedure of Example 1 was employed, utilizing pure candicidin instead of pure candidin, the proportion of acetic anhydride being the same inasmuch as it was used in large excess in Example 1. The reaction and subsequent precipitation, washing, purification and drying operations were the same, yielding in this instance a product which was N-acetyl candicidin, having a melting point of approximately 145° C., with decomposition.

Without need to cite them as separate examples, like procedures were followed for amphotericin B, trichomycin and perimycin, to produce the N-acetyl derivatives of these substances, it being preferable in all cases to employ an excess of acetic anhydride. In the case of amphotericin B, the N-acetyl derivative was found only partially soluble in the original reaction mixture, which would necessitate plural stages of treatment with methanol to obtain a series of somewhat dilute solutions if a high recovery of final product were desired, i.e. by precipitation from such solutions with ether. A preferred procedure in the case of trichomycin may involve a purification operation as set forth in Example 2, inasmuch as the free antibiotic (e.g. as complex, mainly trichomycin B) is usually available only in impure state, e.g. 50% pure. The correspondingly impure acetyl derivative, however, is useful, e.g. of itself or for conversion (preferably with purification) to the soluble salt form.

EXAMPLE 4

N-succinyl derivatives of candidin, amphotericin B, candicidin, and perimycin, were respectively prepared by operations essentially as described in Example 1, using a suitable quantity, e.g. 5 grams, of succinic anhydride, instead of acetic anhydride, in each instance.

By like procedure, which is sufficiently identical with the foregoing operations as to require no detailed delineation (i.e. involving only such changes in amounts or proportions as will be readily apparent), a considerable number of other acyl derivatives have been prepared. Instances of them are N-propionyl candidin, using propionic anhydride, N-chloroacetyl candidin, using the anhydride of chloroacetic acid, and N-maleyl candidin, using the anhydride of maleic acid.

EXAMPLE 5

As an instance of the preparation of a heptaene derivative utilizing an aromatic carboxylic acid, the identical procedure of Example 1 was employed in making N-phthalyl candidin, except that 5 grams of phthalic anhydride were used instead of the acetic anhydride.

By essentially similar procedure, other aromatic derivatives were produced, for instance, N-3-nitrophthalyl candidin, N-phthalyl amphotericin B and N-phthalyl perimycin.

EXAMPLE 6

As an instance of preparation of a water soluble salt, N-acetyl candidin was dissolved in methanol, and the solution was cooled in an ice bath. To the ice bath methanolic sodium hydroxide solution was added until the pH reached 8.0. The sodium salt of N-acetyl candidin, which was created by reaction in the manner just described, was then precipitated by addition of ethyl ether, conveniently in excess. The precipitate was separated, washed thoroughly with ethyl ether, and dried in vacuum. It was found to be highly water soluble, and as explained below, exhibited useful antifungal properties.

EXAMPLE 7

An alternative mode of preparing the sodium salt, for example of N-acetyl candidin, involved providing a suspension of N-acetyl candidin in water, which was chilled in an ice bath, and to which sodium hydroxide solution was added until a pH of 7.5 was reached and maintained. By such neutralization, the N-acetyl candidin reacted to yield the sodium salt in clear solution. This solution was thereafter freeze-dried for recovery of the desired salt.

It will be understood that sodium salts of the other N-acetyl derivatives can be prepared by operations similar to those of Examples 6 and 7, and likewise other salts of inorganic character, such as alkali metal salts (e.g. potassium, lithium, cesium, and ammonium), and the like.

Organic salts of N-acyl heptaenes can likewise be prepared, i.e. in a manner suitable for making such salts by neutralization of carboxylic acids. As an instance of the experimental procedure involved, the brucine salt of each of the several N-acetyl heptaenes was prepared by adding aqueous brucine sulfate, in excess, to the neutral aqueous solution of the sodium salt of each N-acetyl heptaene. The brucine salt (having low solubility in cold water) precipitated under such circumstances, was recovered by centrifuging, and the product was thereafter washed with water, then with acetone and finally with ethyl ether. The brucine salts had sharp melting points; e.g. brucine N-acetyl candidin, M.P. 167° C. dec.

It may be noted that purification of heptaenes can also be accomplished by purification operations on the salt form of the N-acetyl derivative. Thus for instance, the brucine salt of the N-acetyl derivative of an impure heptaene (such as trichomycin) was purified by dissolving the derivative in hot ethanol or water and thereafter precipitating the brucine salt by cooling. The purified N-acetyl derivative itself, can then be recovered by treating the brucine salt with strong mineral acid, e.g. sulfuric acid.

As mentioned above, other organic salts of the N-acyl heptaenes can be prepared, having advantages of water solubility, to a greater or less extent. Examples are amine salts, such as salts formed with trimethyl amine, triethyl amine, and the like, these being very soluble compounds. Salts may also be formed with various alkaloids and alkaloid derivatives, such as quinine, procaine, and the like, which serve to introduce substances having known utility in other respects. While these salts may have less solubility than others, they have an indicated advantage of providing slow release of the active or significant constituents. Among the sodium and like salts, which in general have a high order of water solubility, it is found that in the case of a substance such as the sodium salt of N-acetyl amphotericin B, the water solubility is somewhat less than in the other compounds, being chiefly useful only at somewhat higher values of pH, e.g. above neutrality. This last-mentioned compound nevertheless represents improvement over attempts to provide a sodium salt of the free heptaene, which is understood to exhibit solubility only at extremely high values of pH. Good solubility is afforded with the salts of N-succinyl amphotericin B, although at some sacrifice of activity.

With respect to the chemical nature of the derivatives of the invention, various confirmatory tests have been made. Thus to show that the N-acylation can be effected essentially to completion, the purity of the several N-acetyl heptaenes (prepared as above) in regard to contamination with unreacted heptaene was subjected to analysis by the conventional quantitative ninhydrin method using the free heptaene as the standard. It was found that over 99% of the preparation existed in the N-acetylated form. In the case of heptaenes of Groups II and III, where a disubstituted N-acetyl derivative is produced (including acetylation of the amino aromatic moiety), N-acetyl-p-aminobenzoic acid (corresponding to such moiety) was obtained by chromic acid oxidation in glacial acetic acid of the N-acetylated derivative of such heptaene, viz. trichomycin, candicidin, or perimycin.

Melting points of some of the derivatives have been mentioned above. Although in all cases examined, the melting of the derivative was accompanied by decomposition, it occurred at a relatively sharp point, unlike the free heptaenes themselves. Values for a number of the compounds are as follows:

TABLE A.—Melting points

|  | °C. |
|---|---|
| N-propionyl candidin | 154 |
| N-chloroacetyl candidin | 158 |
| N-succinyl candidin | 151 |
| N-succinyl amphotericin B | 154 |
| N-succinyl perimycin | 140 |
| N-maleyl candidin | 152 |
| N-phthalyl candidin | 158 |
| N-3-nitrophthalyl candidin | 160 |
| N-phthalyl amphotericin B | 155 |
| N-phthalyl perimycin | 145 |

Among still other compounds examined, N-acetyl amphotericin B had a melting point of about 160° C. and N-acetyl perimycin of about 145° C.

In general all of the N-acyl derivatives (as produced) exhibited much more solubility in organic solvents than the free heptaenes; for instance they are quite readily soluble in methanol. As has been stated, various compounds of the present invention are useful in enabling purification of the corresponding heptaenes, e.g. by crystallization of a salt, such as the brucine salt, from water or ethanol, or by counter-current distribution of the free N-acetyl heptaene in the solvent system specified in Example 2.

The N-acyl derivatives are useful in identifying and differentiating these heptaene compounds, particularly in that the derivatives have good properties of stability and solubility which facilitate various chemical and physical tests that might otherwise be of dubious success. Thus, for example, heptaenes to be differentiated or compared can be N-acetylated, as by producing the N-acetyl derivative and comparison effected with such derivatives. Other useful procedure includes preparing the N-acetyl derivative of one compound with radioactive acetic anhydride and then simultaneously submitting it and the N-acetyl derivative of another heptaene, to countercurrent distribution. Identity of the substances can be easily recognized, or differentiation readily noted, even between extremely similar heptaenes, each derivative being characterized by its partition coefficient.

In general, the compounds and their salts are characterized by biological activity which is quantitatively useful and which is qualitiatively similar to that of the original free heptaene. Hence it is apparent that the derivatives, and particularly the water soluble salts, will have similar utility to that of the parent antifungal agent. Special uses are in the prophylaxis and decontamination of tissue cultures, as further explained below.

The biological activity, i.e. antifungal properties, of the substances were examined, and compared with the free heptaenes, taking for purposes of illustration the N-acetyl derivatives.

In these tests, stock solutions of pure perimycin, pure candicidin, pure candidin, pure amphotericin B, and 50% pure trichomycin (in which the trichomycin was the complex, being mostly B) were made in dimethylsulfoxide at the level of 1 mg./ml. for all the antibiotics used, except in the case of trichomycin, which was put in solution in the same solvent at the level of 2 mg./ml. Thus all solutions had equal concentrations of the antibiotics themselves. Stock solutions of the pure sodium salts of the N-acetyl derivatives of the same heptaenes were prepared in water, at the level of 1 mg./ml. In the tests, dilutions were made of the stock solutions, as necessary, to obtain appropriate final concentrations of the compounds in the assay medium, i.e. concentrations of the order of micrograms or hundredths of a microgram per milliliter. Assays were made on peptone-meat extract-glucose agar (see Lechevalier, H.: Comparison of the in vitro Activity of Four Polyenic Antifungal Antibiotics; Antibiotics Annual, 1959–1960, page 614). Comparisons of biological activity of the compounds were made for various fungi, and likewise further assays were made to establish antibiotic spectra.

In these operations, stocks of the several organisms (listed in the tabulations below) were grown on yeast extract-glucose agar for the fungi, and on nutrient agar for the bacteria. The bacteria and the yeasts were incubated at 37° C. for 18 hours and the filamentous fungi at 28° C. for 48 hours before being suspended in water and used to inoculate the assay plates. Incubation of the assay plates was at 28° C. for 48 hours or at 37° C. for 18 hours before minimum inhibitory concentrations were estimated.

The following table shows the comparative activities of the several free heptaenes and the sodium salts of their N-acetyl derivatives. As a matter of interest in comparison, tests were made and included in this table, of nystatin, the desoxycholate complex of nystatin, and N-acetyl nystatin, it being understood that nystatin is a tetraene, i.e. of a class of substances to which the present invention is not related.

Table B.—Comparison of the activity of six polyenes and some of their derivatives on fungi. Streak dilution assay on peptone-meat extract-glucose agar

|  | Minimum inhibitory concentration, µg./ml. | | |
|---|---|---|---|
|  | Candida albicans 204 | Saccharomyces cerevisiae 216 | Aspergillus niger 13 |
| Candidin | 0.6 | 0.5 | 0.38 |
| N-acetyl candidin | 3.4 | 2.1 | 4.2 |
| Amphotericin B | 0.5 | 0.5 | 0.09 |
| N-acetyl amphotericin B | 3.2 | 3.0 | 2.3 |
| Candicidin | 0.04 | 0.03 | 0.83 |
| N-acetyl candicidin | 5.4 | 1.8 | 30.0 |
| Trichomycin | 0.03 | 0.03 | 0.50 |
| N-acetyl trichomycin | 1.9 | 2.0 | 10.0 |
| Perimycin | 0.10 | 0.07 | 0.06 |
| N-acetyl perimycin | 1.1 | 0.47 | 1.2 |
| Nystatin | 1.2 | 0.8 | 2.0 |
| Nystatin desoxycholate complex | 11.0 | 7.0 | 10.0 |
| N-acetyl nystatin | >30 | >30 | >30 |

It will be noted that although the activities of the N-acyl heptaenes were lower than the free compounds, they were nevertheless significant, and corresponded qualitatively. In the case of the tetraene nystatin, it is observed that the N-acetyl derivative had negligible activity, in comparison with the free antibiotic, thus indicating that such compound (of a tetraene, as distinguished from the present heptaenes) is of no apparent value.

By way of example, the following are the antimicrobial spectra of candidin and the sodium salt of N-acetyl candidin:

Table C.—Comparison of the spectrum of antimicrobial activity of candidin and N-acetyl candidin. Streak dilution assay on peptone-meat extract-glucose agar.

|  | Minimum inhibitory concentration, µg./ml. | |
|---|---|---|
|  | Candidin | N-acetyl candidin |
| Candida albicans 204 | 0.5 | 2.5 |
| Candida tropicalis 206 | 0.5 | 1.0 |
| Candida sp. 187 | 0.5 | 2.5 |
| Saccharomyces cerevisiae 216 | 0.5 | 2.5 |
| Aspergillus niger 3 | 1.0 | 5.0 |
| Aspergillus niger 8 | 1.0 | 10.0 |
| Aspergillus niger 13 | 1.0 | 10.0 |
| Aspergillus fumigatus 38 | 0.25 | 2.5 |
| Hansenula anomala 317 | 0.5 | 2.5 |
| Trichopthyta mentagrophytes 171 | 0.5 | 5.0 |
| Mucor rouxii 80 | 0.25 | 2.5 |
| Mycobacterium smegmatis 607 | (¹) | (¹) |
| Nocardia sp. 245 | (¹) | (¹) |
| 3 Streptomyces | (¹) | (¹) |
| 4 gram positive bacteria | (¹) | (¹) |
| 4 gram negative bacteria | (¹) | (¹) |

¹ Growth at 50.

It is notable, from all the above tests, that the N-acetyl derivatives of the several heptaenes exhibited less difference in biological activity among themselves than was characteristic of the parent heptaenes. At laest generally, the antifungal activity of the derivatives, in vitro, was about the same as that of free nystatin, which is understood to be more widely used, at present, than any other polyene.

Elemental analyses of the derivatives of the various heptaenes have been found in agreement with the values expected for their N-substituted character. Thus for instance, the following microanalytical data were obtained for N-acetyl candidin (free candidin being now fairly well established as $C_{46}H_{74}O_{16}N$):

|  | C | H | O | N | Molecular weight |
|---|---|---|---|---|---|
| Found | 61.02 | 8.76 | 28.31 | 1.59 | 941 |
| Calculated for $C_{48}H_{76}O_{17}N$ | 61.40 | 8.10 | 28.99 | 1.50 | 938 |

Studies in vivo have confirmed the activity of the N-acyl derivatives. For example, the sodium salt of N-acetyl candidin has been shown to be effective against *Candida albicans* infection in mice, when administered intraperitoneally in repeated doses. Tests also showed that the N-acetyl candidin was definitely less toxic than free candidin or amphotericin B.

The important utility of the new compounds in tissue culture operations has been confirmed by tests. The cultivation of living tissue, both animal and plant, is widely used for a variety of experimental, investigative and diagnostic purposes, and indeed also for manufacturing purposes, as in the preparation of vaccines, hormones and similar products. These procedures, i.e. of tissue culture (including cell culture), have been put to great use in studies of various animal (including human) tissues, which have been kept alive for long periods of time, indeed even years. Metabolism studies, diagnosis of tumors and infections, studies of various glandular functions, screening of pharmaceutical preparations, and the maintenance of tissue banks, bone banks and skin banks have also involved tissue cultivation. Almost an infinite variety of tissues, which can be kept viable, have been subjected to such techniques, e.g. liver, kidney and spleen tissue, various other organs, skin, bone, bone marrow, and many other cells and organizations of cells.

Tissue cultures must normally be free of microbial contamination, both as to bacteria and as to mold, i.e. fungi. The necessary aseptic techniques have been greatly simplified by the use of anti-bacterial antibolics, such as penicillin, streptomycin and others, but there remains a serious need for a highly suitable antifungal agent which is both readily soluble and non-cytotoxic, i.e. to prevent or destroy mold contamination. While nystatin has been used for the purpose, its utility has been limited by lack of desirable solubility and stability and by cytotoxicity. The water soluble derivatives of heptaene antibiotics, produced in accordance with the present invention, are admirably suited for the purpose, being effective against molds and having the desired solubility and stability, with low toxicity. The new agents are useful both for propylaxis and decontamination of tissue cultures. They are fully soluble in the aqueous media; they do not precipitate nor do they leave any residue, and indeed in serving their function, they gradually disappear.

By way of illustrative example, studies were made with N-acetyl candidin, i.e. in its soluble sodium salt form, with respect to toxicity and effectiveness against fungi, in tissue cultivation employing materials and methods as described in two published papers, viz. (a) Szybalski, W.: Genetics of Human Cell Lines. II. Method for Determination of Mutation Rates to Drug Resistance. Exper. Cell Res. 18: 588, 1959; and (b) Szybalski, W., and Smith, M. J.: Genetics of Human Cell Lines. I. 8-Azaguanine Resistance, A Selective "Single Step" Marker., Proc. Soc. Exper. Biol. Med. 101: 662, 1959. The tissue material which was the subject of the test cultures was a bone marrow material, i.e. originally derived from human bone marrow, and is identified in the papers as D98/AGR. The experimental procedures, including media, methods of plating, cultivation and scoring of colonies were as contained in the papers. The sodium salt of N-acetyl candidin was employed, prepared as described above, and comparison tests were also made with pure candidin. Each of these substances was dissolved or dispersed in three ways, viz. in buffered 0.7% saline solution, in tissue culture medium [being medium $E_{90}$ as described in paper (b)], and in dimethylsulfoxide. The candidin was found to be insoluble in the first two liquids, so that it could only be used in the last-mentioned solvent, which represented a foreign ingredient that would be undesirable in practice. In making the tests, a number of cultures were set up, and the described solutions were added to one or another of them at the time of plating, and supply of the solution was renewed in each instance during the daily or alternate-day change of medium conventional with tissue culture technique.

Various amounts of the antifungal agents were employed, to determine toxicity as well as effectiveness. For the representative type of cells utilized in the study it was found that the acetyl derivative was over thirty times less toxic than the unmodified antibiotic, i.e. as determined by amounts necessary in order to reduce the plating efficiency (colony-forming capacity) of the cultured cells by 50%. From data at various concentrations, it was determined that the acetyl derivative could be safely used at concentrations up to 20 micrograms per milliliter, as a standard component of the medium, and could be used at much higher concentrations for a limited period of a few hours to two days. These results indicate an ample margin of safety in the employment of the substance for antifungal purposes in tissue cultures, inasmuch as common molds and yeasts were found to succumb to the fungicidal activity of the agent at less than 7 micrograms per milliliter of the stated $E_{90}$ medium. Furthermore, inhibitory concentrations for representative organisms of this type, i.e. as tested on peptone glucose agar, were in the range of less than 5 micrograms per milliliter. In comparison, the unmodified antibiotic (candidin) was much more toxic to the cells under cultivation, and required a special solvent.

While the N-acetyl candidin (in sodium salt form) was of limited stability, having a half-life in the $E_{90}$ medium at 37° C. of approximately 24 hours, such characteristic is not objectionable in tissue culture practice, since the antibiotic would be replaced frequently with every change of medium. It was clearly shown by the tests, on tissue cultures artificially infected with common molds and yeast, that the acetyl derivative of the heptaene not only can be used, prophylactically, to prevent infection, but can also be used to disinfect a heavily contaminated culture.

Supplementing other information herein, some further data for identification of certain compounds are as follows: Candidin appears to contain four methyl groups. When pure candidin and amphotericin B were subjected to countercurrent distribution in the ethyl acetate:water:pyridine system (6.5:8.3:3.5) through 200 transfers, in the same machine, the partition coefficients found were: candidin, $K=0.48$; amphotericin B, $K=0.59$. The partition coefficient of pure N-acetyl candidin, as distributed in the same system and manner, was $K=0.36$.

The following is a further description of the antibiotic perimycin itself, being taken from the paper (where additional description also appears) mentioned above as published in Antimicrobial Agents Annual:

Perimycin is a basic heptaene, $C_{47}H_{75}O_{14}N_2$ (tentative), containing two primary amino groups, a number of C-methyl groups, and a number of hydroxyl groups. It does not contain a carboxyl group. The two amino groups are present in an aldolically linked p-aminophenylacetone and in a glycosidically linked amino sugar which differs from mycosamine. Perimycin is more soluble in organic solvents than the other heptaenes.

It is to be understood that the invention is not limited to the specific products and procedures herein set forth by way of example, but may be carried out in other ways without departure from its spirit.

We claim:

1. An N-acylated compound of a heptaene macrolide antifungal antibiotic selected from the class consisting of candidin, amphotericin B, trichomycin, candicidin and perimycin, said antibiotic having amino content which consists solely of from one to two —$NH_2$ radicals, said compound consisting of said antibiotic and N-acyl substitution therein, said compound being free of acyl substitution other than N-acyl substitution, and said N-acyl substitution being incorporated in the said —$NH_2$ content of the antibiotic, and said N-acyl substitution being acyl selected from aliphatic and aromatic, monocarboxylic dicarboxylic acids.

2. A water-soluble salt of a compound as defined in claim 1, said compound being of an antibiotic which is selected from the group consisting of candidin, amphotericin B, trichomycin and candicidin and which contains a carboxyl group, and said salt comprising a water-soluble-salt-forming cation in salt-forming linkage with said carboxyl group.

3. A water-soluble salt of a compound as defined in claim 1, said N-acyl substitution in said compound being acyl which is of a dicarboxylic acid and which contains a carboxyl group, and said salt comprising a water-soluble-salt-forming cation in salt-forming linkage with said carboxyl group.

4. A water-soluble salt of a compound as defined in claim 1, in which compound the N-acyl substitution consists of acyl substitution incorporated in each of the aforesaid one to two —$NH_2$ radicals, each such acyl substitution being the acyl selected as aforesaid, and which compound contains a carboxyl group; said salt comprising a water-soluble-salt-forming cation in salt-forming linkage with said carboxyl group.

5. A compound as defined in claim 1, in which the N-acyl substitution is acyl of an aliphatic acid, said acyl having from 1 to 9 carbon atoms when the acid is monocarboxylic and said acyl having from 2 to 10 carbon atoms when the acid is dicarboxylic.

6. An alkali metal salt of a compound which is defined in claim 5 and which contains carboxyl grouping, said salt being formed by alkali metal in salt-forming linkage with said carboxyl grouping.

7. A heptaene antifungal substance selected from the class consisting of the N-acetyl derivatives of candidin, candicidin and trichomycin, the N-succinyl derivatives of amphotericin B and perimycin and the water-soluble salts of said derivatives, each such derivative containing a carboxyl group, and each such water-soluble salt comprising a water-soluble-salt-forming cation in salt-forming linkage with said carboxyl group.

8. N-acetyl candidin.
9. N-acetyl candicidin.
10. N-acetyl trichomycin.
11. N-succinyl amphotericin B.
12. N-succinyl perimycin.

References Cited by the Examiner

UNITED STATES PATENTS

| | | | |
|---|---|---|---|
| 2,501,014 | 3/1950 | Wintersteiner | 167—65 |
| 2,533,033 | 12/1950 | Moore | 167—51.5 |
| 2,565,653 | 8/1951 | Fried | 167—65 |
| 2,576,825 | 11/1951 | Delmar | 260—397.7 |
| 2,705,696 | 4/1955 | Wolf | 167—78 |
| 2,816,902 | 12/1957 | Gould | 260—397.45 |
| 2,871,160 | 1/1959 | Johnson | 167—77 |
| 2,872,373 | 2/1959 | Siminoff | 167—65 |
| 2,908,612 | 10/1959 | Dutcher et al. | 167—65 |
| 2,922,783 | 1/1960 | Kuhn | 167—65 |
| 2,966,443 | 12/1960 | Cox | 167—65 |
| 3,020,274 | 2/1962 | Eble | 167—65 |
| 3,036,120 | 5/1962 | Hammer | 167—65 |
| 3,132,069 | 5/1964 | Yamamoto | 167—65 |

FOREIGN PATENTS 207,376  6/1956  Australia.

OTHER REFERENCES

Ball: J. Gen. Microbiol., vol. 17, pp. 96–103, August 1957.

Clarke: The Chemistry of Penicillin, Princeton Univ. Press, 1949, pp. 471–472.

Dutcher: Antibiotics Annual, pp. 866–869, 1956–1957.

Hattori: J. of Antibiotics, vol. 9, No. 5, September 1956, pp. 176–181.

Ozaki: Chem. Abst., vol. 51, p. 8982(f), 1957.

Patrick: J. Am. Chem. Soc., Dec. 20, 1958, pp. 6688–6689, vol. 80.

Vining: Antibiotics Annual, p. 986, 1954–1955.

Walters: J. Am. Chem. Soc., vol. 79, No. 18, pp. 5076–5077, September 1957.

Craig: Technique of Organic Chemistry, vol. III, 1950, Interscience, New York, N.Y., chapter IV, pp. 171–311.

Pfizer: Handbook of Microbial Metabolites, McGraw-Hill, New York, N.Y., 1961, p. 122.

Tavel: Advances in Protein Chemistry, vol. XI, 1956, Academic Press, New York N.Y., pp. 237–310.

Weisiger: Organic Analysis, vol. 2, 1954, Interscience, New York N. Y., pp. 277–326.

LEWIS GOTTS, *Primary Examiner.*

W. B. KNIGHT M. O. WOLK,
FRANK CACCIAPAGLIA, Jr., *Examiners.*